United States Patent
Kawana

(10) Patent No.: US 10,639,764 B2
(45) Date of Patent: May 5, 2020

(54) GRINDING APPARATUS

(71) Applicant: DISCO CORPORATION, Tokyo (JP)

(72) Inventor: Mamoru Kawana, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/657,963

(22) Filed: Jul. 24, 2017

(65) Prior Publication Data

US 2018/0029187 A1  Feb. 1, 2018

(30) Foreign Application Priority Data

Jul. 26, 2016 (JP) ................... 2016-145924

(51) Int. Cl.
| | |
|---|---|
| B24B 55/02 | (2006.01) |
| B23Q 11/10 | (2006.01) |
| B24B 7/10 | (2006.01) |
| B24B 41/00 | (2006.01) |
| B24B 41/06 | (2012.01) |
| B24B 7/04 | (2006.01) |
| B24B 7/22 | (2006.01) |

(52) U.S. Cl.
CPC ............ *B24B 7/10* (2013.01); *B23Q 11/10* (2013.01); *B24B 7/04* (2013.01); *B24B 7/228* (2013.01); *B24B 41/007* (2013.01); *B24B 41/061* (2013.01); *B24B 55/02* (2013.01)

(58) Field of Classification Search
CPC ......... B24B 7/04; B24B 7/228; B24B 41/004; B24B 55/02; B23Q 11/10
USPC ........................................................ 451/449
See application file for complete search history.

(56) References Cited

U.S. PATENT DOCUMENTS

| | | | | | |
|---|---|---|---|---|---|
| 2,198,282 | A | * | 4/1940 | Hall ................. | B24D 13/18 15/230 |
| 2,410,812 | A | * | 11/1946 | De Michel ........ | B24D 9/08 15/230.1 |
| 3,982,704 | A | * | 9/1976 | Palyi ................ | B02C 7/12 241/298 |
| 4,813,186 | A | * | 3/1989 | Wilde ............... | B24B 49/08 451/1 |
| 4,857,694 | A | * | 8/1989 | Doyle .............. | B23K 37/003 219/76.12 |
| 6,358,119 | B1 | * | 3/2002 | Shih ................. | B24B 37/015 451/36 |
| 8,062,098 | B2 | * | 11/2011 | Duescher .......... | B24B 37/14 451/259 |

(Continued)

FOREIGN PATENT DOCUMENTS

JP  2000-006018  1/2000

*Primary Examiner* — Eileen P Morgan

(74) *Attorney, Agent, or Firm* — Greer Burns & Crain Ltd.

(57) ABSTRACT

A grinding apparatus includes a holding table for holding a wafer, a support table for supporting the holding table, a motor for rotating the support table, a frame member supporting the support table for rotation, and at least three support poles for supporting the frame member from the base. Each of the support poles has formed in the inside thereof a through-hole, a supply port which communicates the through-hole and an air supply source with each other, and an exhaust port which exhausts air having flowed through the through-hole toward the support table. Air is supplied into the through-hole to cool the support pole, and the air having flowed through the through-hole is exhausted toward the support table.

2 Claims, 3 Drawing Sheets

(56) References Cited

U.S. PATENT DOCUMENTS

| | | | | |
|---|---|---|---|---|
| 2005/0260938 A1* | 11/2005 | Okuda | ................. | B24B 37/015 |
| | | | | 451/285 |
| 2008/0214095 A1* | 9/2008 | Dovel | ....................... | B24B 3/36 |
| | | | | 451/65 |
| 2009/0036032 A1* | 2/2009 | Hu | ......................... | B23H 5/08 |
| | | | | 451/41 |
| 2016/0101500 A1* | 4/2016 | Fung | ................... | B24B 37/015 |
| | | | | 156/345.12 |

* cited by examiner

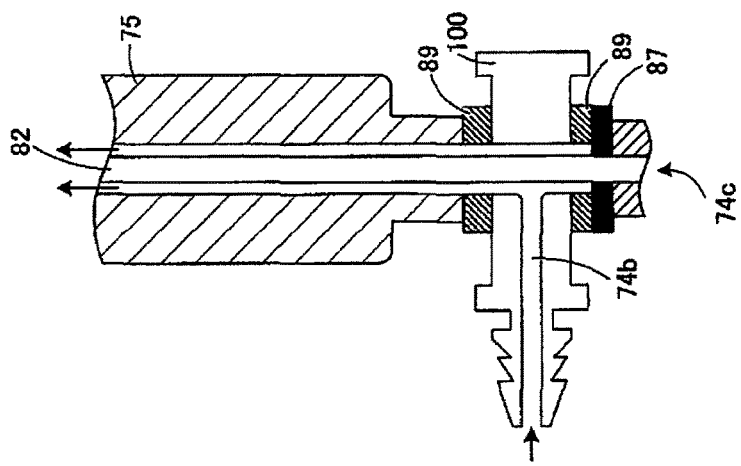
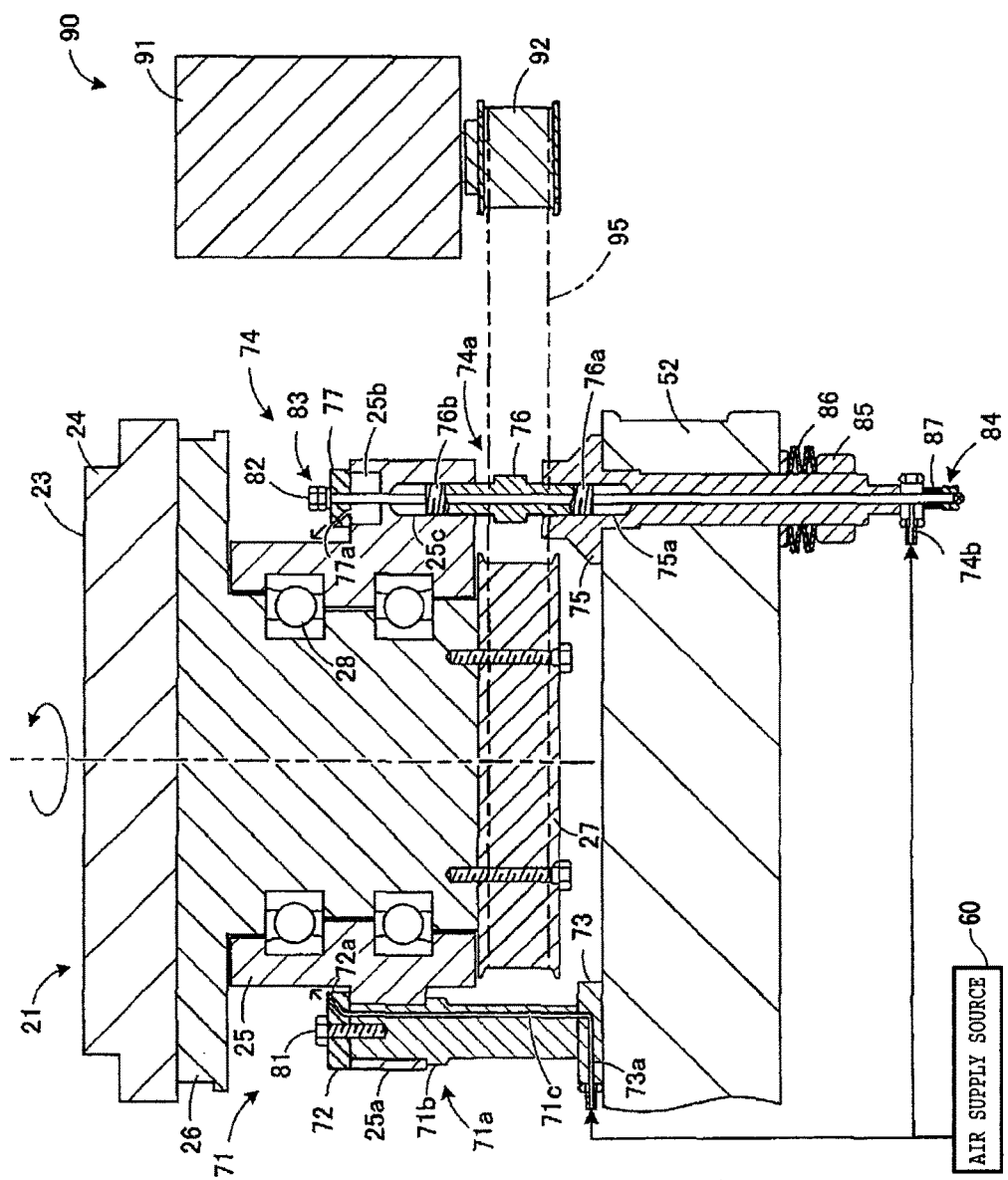

FIG.3A
FIG.3B
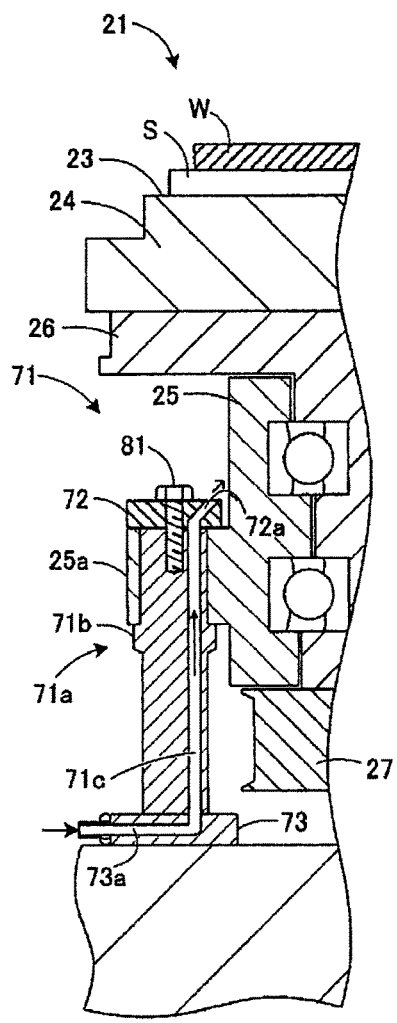
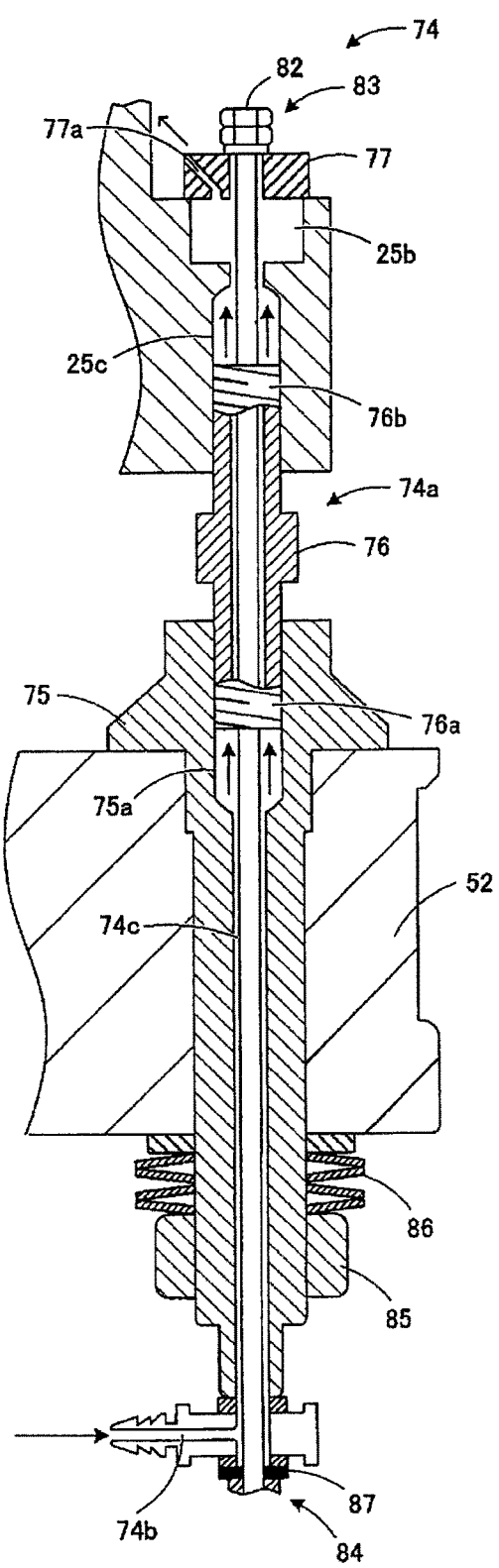

GRINDING APPARATUS

BACKGROUND OF THE INVENTION

Field of the Invention

The present invention relates to a grinding apparatus which grinds a wafer held on a holding table.

Description of the Related Art

A grinding apparatus for grinding a wafer grinds an upper face of a wafer held on a holding face of a holding table by grindstones. During grinding, the holding table is rotated and the grindstones are contacted during rotation thereof with the wafer to grind the wafer, and therefore, processing heat is generated on the wafer. The processing heat generated on the wafer is transmitted to the holding table, and the holding table receiving the heat is sometimes deformed by thermal expansion thereof. Therefore, in the grinding apparatus, while the wafer is ground, grinding water is supplied to the upper face of the wafer to remove the processing heat (refer, for example, to Japanese Patent Laid-Open No. 2000-006018).

SUMMARY OF THE INVENTION

Incidentally, where the wafer is a hard board such as a sapphire board or a silicon carbide board, since a grinding load is required, a substrate made of ceramics is pasted in place of a protective tape to a wafer to hold the wafer on the holding table. Since the substrate is easy to transmit heat, even if grinding water is supplied to an upper face of the wafer, processing heat is transmitted to the substrate and is further transmitted to a support pole, which supports the holding table thereon, through the holding table. Further, since the wafer is hard, a long period of time is required for grinding, and the period of time within which heat is transmitted to the support pole becomes long. Therefore, there is the possibility that the support pole may be thermally expanded, resulting in change of the inclination of the holding face of the holding table.

Therefore, it is an object of the present invention to provide a grinding apparatus which can suppress an inclination change of a holding table caused by thermal expansion thereby to make it possible to grind a wafer well.

In accordance with an aspect of the present invention, there is provided a grinding apparatus including a base; holding means having a holding table for holding a wafer, a support table for supporting the holding table, a motor for rotating the support table, a frame member supporting the support table for rotation, and at least three support poles for supporting the frame member on the base; and grinding means for grinding the wafer held on the holding table by grindstones; each of the support poles having a through-hole which is connected at a lower end thereof to the base and at an upper end thereof to the frame member and extends through the inside of the support pole, a supply port disposed at a lower end side of the through-hole and communicating the through-hole and an air supply source with each other, and an exhaust port disposed at an upper end side of the through-hole and configured to exhaust air, which has flowed in the through-hole, toward the support table; air being supplied into the through-hole to cool each of the support poles while the air having flowed through the through-hole is exhausted toward the support table to cool the support table thereby to prevent thermal deformation of the support pole and the support table.

According to the configuration described above, since processing heat transmitted to each support pole can be cooled by supplying air into the through-hole, thermal expansion of the support pole can be suppressed. Further, since the support table can be cooled by exhausting the air toward the support table, thermal expansion of the support table can be suppressed. Since thermal expansion of the support poles and the support table can be suppressed, a variation of the inclination of the holding table by thermal expansion is prevented. Therefore, a wafer is held suitably on the holding table and can be ground well.

Preferably, at least one of the three support poles includes an adjustment mechanism for adjusting a distance between the frame member and the base. The adjustment mechanism includes a base portion disposed on the base and having a first female threaded hole extending downwardly from an upper end thereof in a direction depending from an upper face of the base, and a threaded pole which has formed at a lower end thereof a first male thread which is screwed in the first female threaded hole and has formed at an upper end thereof a second male thread which is screwed in a second female threaded hole extending in parallel to an extension direction of the first female threaded hole at a thread pitch different from a thread pitch of the first female threaded hole and extending through the frame member and which connects the base and the frame member to each other. The adjustment mechanism has formed therein a through-hole which extends through the inside of the adjustment mechanism in an extension direction of the adjustment mechanism, the supply port communicates the through hole and the air supply source at a lower end side of the adjustment mechanism, and the exhaust port exhausts air, which has flowed through the through-hole, toward the support table at an upper end side of the adjustment mechanism. Thus, air is supplied into the through-hole to cool the threaded pole while the air having flowed through the through-hole is exhausted toward the support table to cool the support table thereby to prevent thermal deformation of the threaded pole and the support table.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIGS. 2A and 2B are vertical sectional views of holding means according to the present embodiment; and FIGS. 3A and 3B are sectional views depicting an example of cooling operation for a support pole and a support table according to the present embodiment.

DETAILED DESCRIPTION OF THE PREFERRED EMBODIMENT

Figure 1:
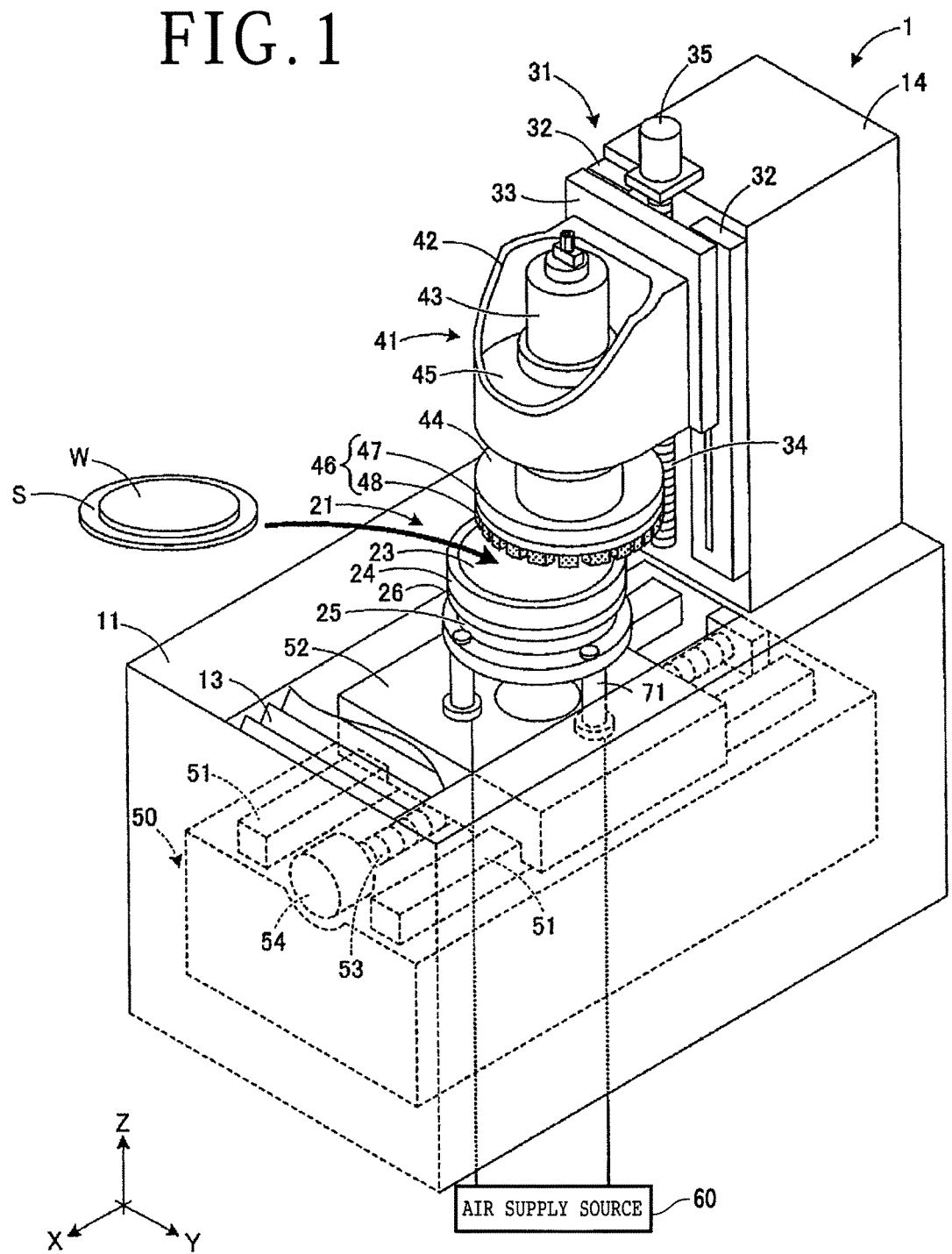
FIG. 1 is a perspective view of a grinding apparatus according to an embodiment of the present invention.

In the following, a grinding apparatus according to an embodiment of the present invention is described with reference to the accompanying drawings. FIG. 1 is a perspective view of the grinding apparatus according to the present embodiment. It is to be noted that the grinding apparatus according to the present embodiment is not limited to an apparatus configuration for exclusive use for grinding processing as depicted in FIG. 1 and may be incorporated, for example, in a grinding processing apparatus or a processing apparatus of the fully automated type by which a series of processes such as grinding, polishing, washing and so forth are carried out fully automatically.

As depicted in FIG. 1, the grinding apparatus 1 is configured such that a wafer W held on a holding table 24 is ground using a grinding wheel 46 having a large number of grindstones 48 disposed annularly. In the grinding apparatus 1, an axis of rotation of the holding table 24 and an axis of rotation of the grinding wheel 46 are disposed in a spaced relationship from each other, and when the grindstones 48 pass on an upper face of the wafer W, the wafer W is ground and thinned. To a lower face of the wafer W, a substrate S in the form of a disk having an outer diameter greater than that of the wafer W is pasted by wax or the like. It is to be noted that, for the wafer W, sapphire, silicon carbide and so forth can be used.

On a column 14 on a base 11, grinding feeding means 31 for moving grinding means 41 in directions toward and away from the holding table 24 in a grinding feeding direction (Z-axis direction) is provided. The grinding feeding means 31 includes a pair of guide rails 32 disposed on the column 14 and extending in parallel to the Z-axis direction, and a motor-driven Z-axis table 33 mounted for sliding movement on the pair of guide rails 32. Nut portions not depicted are formed on the rear face side of the Z-axis table 33, and a ball screw 34 is screwed in the nut portions. When the ball screw 34 is driven to rotate by a driving motor 35 connected to one end portion of the ball screw 34, the grinding means 41 is moved in the Z-axis direction along the guide rails 32.

The grinding means 41 is attached to a front face of the Z-axis table 33 through a housing 42 and is configured providing a mount 44 at a lower end of a spindle 43 including a motor and so forth. A flange 45 is provided on the spindle 43, and the grinding means 41 is supported on the housing 42 through the flange 45. On a lower face of the mount 44, the grinding wheel 46 is mounted for rotation. The grinding wheel 46 includes a wheel base 47 on which the plurality of grindstones 48 are disposed annularly on a true circle. The grinding wheel 46 is rotated by driving of the spindle 43. The plurality of grindstones 48 are configured, for example, from segment grindstones formed by solidifying diamond abrasive grains by a bonding agent such as metal bond or the like. The wafer W held on the holding table 24 is ground by the grindstones 48.

The holding table 24 is provided below the grinding means 41. A holding face 23 which absorbs the wafer W by a porous material is formed on the surface of the holding table 24. The holding face 23 is connected to a suction source (not depicted) through a flow path in the chuck holding table 24, and the wafer W is attracted to and held on the holding face 23 by negative pressure generated on the holding face 23.

The holding table 24 is supported from below by three support poles 71 (74), which are provided uprightly on a movable base (base) 52 of moving means 50 hereinafter described, through a support table 26 and a frame member 25. The support table 26 is rotated by a motor 91 (refer to FIG. 2) which configures rotation means 90 hereinafter described, and thereby rotates the holding table 24. The holding table 24, the support table 26, the frame member 25, the support poles 71 (74) and the rotation means 90 configure holding means 21 for holding the wafer W.

A rectangular opening extending in an X-axis direction is formed on an upper face of the base 11 of the grinding apparatus 1, and this opening is covered with a waterproof cover 13 of a bellows shape. Below the waterproof cover 13, the moving means 50 for moving the holding table 24 in the X-axis direction is provided.

The moving means 50 includes a pair of guide rails 51 disposed on the movable base 52 and extending in parallel to the X-axis direction, and a ball screw 53 disposed between the pair of guide rails 51. The movable base 52 described hereinabove is mounted for sliding movement on the pair of guide rails 51. A nut portion (not depicted) is formed at the rear face side of the movable base 52, and the ball screw 53 is screwed in the nut portion. A driving motor 54 connected to one end portion of the ball screw 53 is driven to rotate to move the holding table 24 in the X-axis direction along the pair of guide rails 51. The holding table 24 is moved from a loading position for a wafer W to a grinding position by the moving means 50 to position the wafer W such that grinding is started by the grinding means 41.

During grinding, since the holding table is rotated and the grindstones are brought into contact with the wafer W while being rotated to grind the wafer W, processing heat is generated on the wafer W by friction between the grindstones and the wafer W. The processing heat is transmitted through the holding table to the support table and the support pole by which the holding table is supported. Therefore, there is a problem that the support pole and the support table are thermally expanded by the processing heat. Further, by the rotation of the motor, motor heat is generated, and the temperature around the holding table rises. Therefore, even if grinding water is supplied to the upper face of the wafer W, the processing heat cannot be removed fully, and the thermal expansion of the support pole and the support table may cause change of the inclination of the holding face of the holding table.

Where the wafer W is a hard board of silicon or the like, the wafer W is held on the holding table through the substrate S. However, the processing heat is likely to be transmitted to the support table and the support pole through the substrate S. Especially, since the hard wafer W requires a long grinding time period and heat continues to be transmitted for a long period of time to the support pole and the support table, the change of the support pole and the support table by thermal expansion becomes great. Therefore, in the present embodiment, through-holes 71c and 74c are formed in each support pole 71 (74) to feed air therethrough to cool the processing heat to be transmitted to the support pole 71 (74), and further, by exhausting the air toward the support table 26, the support table 26 is cooled by the air.

In the following, a configuration of the holding means 21 according to the present embodiment is described in detail with reference to FIGS. 2A and 2B. FIGS. 2A and 2B are vertical sectional views of the holding means 21 according to the present embodiment. As depicted in FIG. 2A, the holding table 24 is supported from below by the support table 26, and the support table 26 is supported for rotation on the frame member 25 through bearings 28. A flange 25a is formed such that it projects from an outer periphery of the frame member 25, and the holding table 24 is supported by the three support poles 71 and 74 (one is not depicted) provided uprightly on the movable base 52 on the flange 25a. The motor 91 which configures the rotation means 90 is installed sidewardly of the support table 26, and a driving pulley 92 is attached to an output power shaft of the motor 91. A driven pulley 27 is attached to a lower end of the support table 26 by a bolt. A belt 95 extends between and around the driven pulley 27 and the driving pulley 92. If the motor 91 is driven, driving force is transmitted from the driving pulley 92 to the driven pulley 27 through the belt 95 to rotate the holding table 24 integrated with the support table 26.

The support pole 71 is configured such that a holding down portion 72 for holding down the flange 25a is provided at an upper end of a support pole main body 71a and a joint portion 73 is provided at a lower end of the support pole main body 71a. The lower end of the support pole main body 71a of the support pole 71 is connected to the movable base 52, and the upper end of the support pole main body 71a is pushed in an attachment hole of the flange 25a of the frame member 25. The flange 25a is supported from below by a stopper portion 71b provided at an intermediate position of the support pole main body 71a. The holding down portion 72 is disposed at an upper end side of the support pole main body 71a, and an upper end of the support pole 71 is connected to the frame member 25 by screwing a bolt 81 into a female thread formed at an upper end side of the support pole main body 71a through the holding down portion 72. The through-hole 71c is formed in the inside of the support pole main body 71a.

A supply port 73a which communicates the through-hole 71c and an air supply source 60 with each other is disposed at the joint portion 73 at the lower end side of the support pole 71, and an exhaust port 72a which exhausts air, which has flowed through the through-hole 71c, toward the support table 26 is disposed at the holding down portion 72 at the upper end side of the support pole 71. If air is supplied from the air supply source 60 to the supply port 73a, then the air entering from the supply port 73a passes through the through-hole 71c and is exhausted from the exhaust port 72a. By the air flowing in the support pole 71, processing heat transmitted to the support pole 71 is cooled, and processing heat transmitted to the support table 26 is cooled by the air exhausted from the exhaust port 72a toward the support table 26. Consequently, the support pole 71 and the support table 26 are cooled and prevented from being thermally deformed.

Meanwhile, the support pole 74 includes an adjustment mechanism 74a for adjusting the distance between the frame member 25 and the movable base 52. The adjustment mechanism 74a is configured such that a threaded pole 76 is disposed between the frame member 25 and a base portion 75 of a shape of a bar provided uprightly on the movable base 52 such that the inclination of the holding table 24 is adjusted by rotation of the threaded pole 76. An upper end of the base portion 75 is formed like a flange, and a lower end of the base portion 75 has a male thread formed thereon. The base portion 75 is pushed in an attachment hole of the movable base 52 while the flange portion at the upper end of the base portion 75 is abutted with an upper face of the movable base 52, and a nut 85 is tightened to the male threaded portion projecting from the lower face of the movable base 52 with a disc spring 86 interposed therebetween. On the base portion 75, a first female threaded hole 75a is formed such that it extends downwardly from the upper end of the base portion 75 in a direction depending from the upper face of the movable base 52. Further, the base portion 75 extends from a bottom portion of the first female threaded hole 75a toward the lower end of the base portion 75.

The threaded pole 76 is a double-sided screw, and a first male thread 76a for being screwed into the first female threaded hole 75a of the base portion 75 is formed at a lower end of the threaded pole 76 while a second male thread 76b for being screwed into a second female threaded hole 25c of the frame member 25 is formed at an upper end of the threaded pole 76. The second female threaded hole 25c of the frame member 25 has a thread pitch different from that of the first female threaded hole 75a and extends in parallel to an extension direction of the first female threaded hole 75a. Further, the inside of the threaded pole 76 extends from the upper end toward the lower end through the threaded pole 76.

A depression 25b is formed above the second female threaded hole 25c, namely, on the upper face of the flange 25a, and the bottom face of the depression 25b extends toward the second female threaded hole 25c. In other words, the second female threaded hole 25c extends through the frame member 25. Further, a holding down portion 77 is disposed so as to cover the depression 25b, and a connection bar 82 is pushed in the through-holes of the flange 25a, the threaded pole 76 and the base portion 75 through the holding down portion 77. A male thread is formed at the opposite ends of the connection bar 82, and the double nuts 83 and 84 are tightened to the male threads of the connection bar 82 to attach the support pole 74 to the frame member 25. Further, the base portion 75 is tightened by the nut 85 through the disc spring 86 to prevent loosening of the base portion 75 with respect to the movable base 52. Further, the lower end of the connection bar 82 is tightened by the double nut 84 through a disc spring 87 to prevent loosening of the first and second male threads 76a and 76b of the threaded pole 76.

Further, since the second female threaded hole 25c is formed with a thread pitch different from that of the first female threaded hole 75a as described hereinabove, rotation of the threaded pole 76 varies the amount of movement of the threaded pole 76 with respect to the base portion 75 and the amount of movement of the frame member 25 with respect to the threaded pole 76. Since the variation amounts of the upward and downward movements of the threaded pole 76 are different from each other, the distance from the movable base 52 to the frame member 25 can be adjusted finely. Consequently, the inclination of the holding face 23 of the holding table 24 with respect to the grinding plane of the grindstones 48 (refer to FIG. 1) can be adjusted with high accuracy.

As depicted in FIG. 2B, the through-hole 74c is formed in the inside of the adjustment mechanism 74a such that it extends through the adjustment mechanism 74a in the extension direction of the adjustment mechanism 74a. The connection bar 82 is inserted in the through-hole 74c with a gap left therebetween, and the gap between the through-hole 74c and the connection bar 82 forms a path for air. To a lower end side of the adjustment mechanism 74a, namely, to a lower end side of the base portion 75, a joint portion 100 having a T-shaped path therein is connected with a seal 89 interposed therebetween such that the connection portion between the joint portion 100 and the base portion 75 is sealed airtight.

At the joint portion 100 at the lower end side of the adjustment mechanism 74a, a supply port 74b is disposed such that it communicates the through-hole 74c and the air supply source 60 with each other, and at the holding down portion 77 at the upper end side of the adjustment mechanism 74a, an exhaust port 77a is disposed such that it exhausts air having flowed to the through-hole 74c toward the support table 26. If air is supplied from the air supply source 60 to the supply port 74b, then the air entering from the supply port 74b passes through the gap between the through-hole 74c and the connection bar 82 and is exhausted from the exhaust port 77a. Processing heat transmitted to the support pole 74 is cooled by the air flowing in the support pole 74, and processing heat transmitted to the support table 26 is cooled by the air exhausted from the exhaust port 77a toward the support table 26. Consequently, the support pole 74 and the support table 26 are cooled and prevented from being thermally deformed.

Now, cooling operation for the support poles 71 and 74 and the support table 26 is described in detail with reference to FIGS. 3A and 3B. FIGS. 3A and 3B are sectional views illustrating an example of cooling operation for the support poles 71 and 74 and the support table 26 according to the present embodiment. As depicted in FIG. 3A, the wafer W is placed on the holding face 23 of the holding table 24 with the substrate S interposed therebetween. If the motor 91 is driven, then the driven pulley 27 is driven to rotate the support table 26 (refer to FIG. 2) thereby to rotate the holding table 24. The grindstones 48 (refer to FIG. 1) are rotated and brought into contact with the wafer W, and the wafer W is ground while grinding water is supplied to the upper face of the wafer W (refer to FIG. 1). At this time, processing heat is generated by friction between the wafer W and the grindstones 48, and air around the holding table 24 is warmed by motor heat. The processing heat is transmitted to the substrate S and is transmitted through the holding table 24 to the support table 26, the frame member 25 and the support poles 71 and 74 by which the holding table 24 is supported. Meanwhile, air around the frame member 25 and the support poles 71 and 74 is warmed by the motor heat, and the processing heat becomes less likely to be removed.

In this case, in the support pole 71, air is fed into the supply port 73a by the air supply source 60 and flows in from the supply port 73a toward the exhaust port 72a through the through-hole 71c. The air flowing in the through-hole 71c cools the support pole 71 while removing heat from the support pole 71 and is exhausted from the exhaust port 72a toward the support table 26. Consequently, the support pole 71 is cooled to suppress thermal expansion thereof, and air around the holding table 24 is cooled to suppress thermal expansion of the support table 26 through the frame member 25.

On the other hand, as depicted in FIG. 3B, in the support pole 74, air is fed into the supply port 74b by the air supply source 60 and flows in from the supply port 74b toward the exhaust port 77a through the gap between the through-hole 74c and the connection bar 82. The air flowing in the through-hole 74c cools the support pole 74 (threaded pole 76) and the flange 25a while removing heat from the support pole 74 (threaded pole 76) and flange 25a and enters the depression 25b, whereafter it is exhausted from the exhaust port 77a toward the support table 26. Consequently, the support pole 74 is cooled and thermal expansion thereof is suppressed, and air around the holding table 24 is cooled to cool the frame member 25 thereby to suppress thermal expansion of the support table 26 through the frame member 25.

Since processing heat transmitted to the support poles 71 and 74 can be cooled by supplying air into the through-holes 71c and 74c as described above, thermal expansion of the support poles 71 and 74 can be suppressed. Further, since the support table 26 can be cooled by exhausting air toward the support table 26, thermal expansion of the support table 26 can be suppressed. Since thermal expansion of the support poles 71 and 74 and the support table 26 can be suppressed, a variation of the inclination of the holding table 24 by thermal expansion can be prevented. Therefore, the wafer W is held suitably on the holding table 24 and can be ground well.

While the embodiment described above is configured such that sapphire or silicon carbide is used for the wafer W, the wafer W may otherwise be a semiconductor board of silicon, gallium arsenide or the like or may be a board formed from resin, metal or the like. Further, the wafer W may not have a substrate S pasted thereto.

Further, while the embodiment described above is configured such that it includes three support poles, it may include at least three support poles. Further, the adjustment mechanism may be provided for all support poles or may be provided for one support pole. Alternatively, the adjustment mechanism may not be provided in any of the support poles.

Further, the embodiment of the present invention is not limited to the embodiment described above but may be changed, replaced or modified in various manners without departing from the subject matter of the technical idea of the present invention. Furthermore, if the technical idea of the present invention can be implemented in a different manner by advances in technology or by a different derived technology, the present invention may be carried out using the method. Accordingly, the claim covers the embodiment which may be included in the technical idea of the present invention.

While the description of the embodiment is directed to the configuration in which the present invention is applied to a grinding apparatus for grinding a wafer W, also it is possible to apply the present invention to a processing apparatus in which processing heat transmitted to a holding table is cooled.

As described above, the present invention has an advantageous effect that a variation of the inclination of a holding table by thermal expansion is suppressed to make it possible to grind a wafer well and is useful particularly to a grinding apparatus by which a wafer held on the holding table is ground.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A grinding apparatus comprising:
   a base;
   holding means including a holding table for holding a wafer, a support table for supporting the holding table, a motor for rotating the support table, a frame member supporting the support table for rotation, and at least three support poles for supporting the frame member on the base; and
   grinding means for grinding the wafer held on the holding table by grindstones;
   each of the support poles having a through-hole which is connected at a lower end thereof to the base and at an upper end thereof to the frame member and extends through the inside of the support pole, a supply port disposed at a lower end side of the through-hole and communicating the through-hole and an air supply source with each other, and an exhaust port disposed at an upper end side of the through-hole and configured to exhaust air, which has flowed in the through-hole, toward the support table;
   air being supplied into the through-hole to cool each of the support poles while the air having flowed through the through-hole is exhausted toward the support table to cool the support table thereby to prevent thermal deformation of the support pole and the support table.

2. The grinding apparatus according to claim 1, wherein at least one of the three support poles includes an adjustment mechanism for adjusting a distance between the frame member and the base, the adjustment mechanism includes a base portion disposed on the base and having a first female threaded hole extending downwardly from an upper end thereof in a direction depending from an upper face of the base, and a threaded pole which has formed at a lower end thereof a first male thread which is screwed in the first female threaded hole and has formed at an upper end thereof a second male thread which is screwed in a second female threaded hole extending in parallel to an extension direction of the first female threaded hole at a thread pitch different from a thread pitch of the first female threaded hole and extending through the frame member and which connects the base and the frame member to each other, the adjustment mechanism having formed therein a through-hole which extends through the inside of the adjustment mechanism in an extension direction of the adjustment mechanism, the supply port communicating the through hole and the air supply source at a lower end side of the adjustment mechanism, the exhaust port exhausting air, which has flowed through the through-hole, toward the support table at an upper end side of the adjustment mechanism, and air is supplied into the through-hole to cool the threaded pole while the air having flowed through the through-hole is exhausted toward the support table to cool the support table thereby to prevent thermal deformation of the threaded pole and the support table.

* * * * *